United States Patent

Shields

[19]

[11] Patent Number: 6,133,958
[45] Date of Patent: Oct. 17, 2000

[54] BROADCAST VIDEO DESYNCHRONIZER

[75] Inventor: James Alexander Shields, Carrickfergus, United Kingdom

[73] Assignee: Nortel Networks Limited, Montreal, Canada

[21] Appl. No.: 09/011,571

[22] PCT Filed: Jul. 29, 1996

[86] PCT No.: PCT/GB96/01847

§ 371 Date: Apr. 2, 1998

§ 102(e) Date: Apr. 2, 1998

[87] PCT Pub. No.: WO97/05719

PCT Pub. Date: Feb. 13, 1997

[30] Foreign Application Priority Data

Jul. 29, 1995 [GB] United Kingdom .................... 9515592

[51] Int. Cl.$^7$ ...................................................... H04N 5/05
[52] U.S. Cl. ............................ 348/505; 348/500; 348/7; 348/10; 375/358; 375/371
[58] Field of Search ................... 348/500, 10, 6, 348/7, 678, 508, 528, 536, 505; 375/358, 363, 370, 118, 354, 371, 372, 373, 374, 375, 376; H04N 5/05

[56] References Cited

U.S. PATENT DOCUMENTS

| | | | |
|---|---|---|---|
| 5,052,025 | 9/1991 | Duff et al. ............................... | 375/118 |
| 5,067,126 | 11/1991 | Moore .................................... | 370/112 |
| 5,157,655 | 10/1992 | Hamilton, Jr. ............................ | 370/84 |
| 5,268,935 | 12/1993 | Mediavilla et al. ...................... | 375/118 |
| 5,311,511 | 5/1994 | Reilly et al. ............................. | 375/118 |
| 5,313,502 | 5/1994 | Nawrocki et al. ....................... | 375/118 |
| 5,337,315 | 8/1994 | Ehrlich ................................... | 375/118 |
| 5,337,334 | 8/1994 | Molloy ................................... | 375/118 |
| 5,351,014 | 9/1994 | Ichiyoshi ................................ | 331/1 A |
| 5,367,545 | 11/1994 | Yamashita et al. ..................... | 375/118 |
| 5,390,180 | 2/1995 | Reilly ...................................... | 375/118 |
| 5,402,452 | 3/1995 | Powell et al. ........................... | 375/372 |
| 5,404,380 | 4/1995 | Powell et al. ........................... | 375/363 |
| 5,537,447 | 7/1996 | Urbansky ................................ | 375/372 |
| 5,784,420 | 7/1998 | Rohr ....................................... | 375/354 |

FOREIGN PATENT DOCUMENTS 0 491 054  6/1992  European Pat. Off. .

OTHER PUBLICATIONS

Say, "A Synchronous Desynchronizer", Contribution To T1 Standards Project, Jul. 25, 1988, pp. 2–9.

*Primary Examiner*—John K. Peng
*Assistant Examiner*—Jean W. Désir
*Attorney, Agent, or Firm*—Lee, Mann, Smith, McWilliams, Sweeney & Ohlson

[57] ABSTRACT

An arrangement for desynchronizing video signals transported in virtual containers in frames over a synchronous network comprises a feedback loop incorporating a FIFO buffer store and a tuneable oscillator adapted to provide a video line clock from demapped video information. Each virtual container is identified within a frame by a pointer introduced by the synchronous transport process, and the loop is arranged to overcome the interference of these pointers with the color subcarrier in the desynchronized signal. The loop has a bandwidth sufficiently narrow to effectively ignore phase noise created by the pointers. The oscillator frequency is controlled such that the rate of information flow around the loop is substantially constant. Video bytes are written into the buffer store and are then read at a controlled rate determined by the oscillator frequency.

6 Claims, 1 Drawing Sheet

BROADCAST VIDEO DESYNCHRONIZER

This invention relates to the provision of television or video services on a synchronous network, and in particular to the desynchronisation of such services at a user station.

BACKGROUND OF THE INVENTION

The provision of 34 Mbits television services on the synchronous network requires stringent control of low frequency phase at the desynchroniser. As 34 M video codecs linearly encode the colour sub carrier of the PAL signal, any phase disturbances introduced by the synchronous transport (e.g. SDH) network propagate through the codec and into the reconstituted video. There are two bounding parameters that the video network providers consider to be important to deliver an acceptable quality of service to customers. First the phase transients in the bit stream must be such that the colour sub carrier, at 4.43 MHz will have no greater than a 0.1 Hz per second rate of change. Second, the delay budget in a telephony link must be no more than 100 microseconds. The final parameter of interest in bounding the desynchroniser system is that the network requires a minimum of 30 s to set up a connection. This is very much a worst case scenario, and more common switch times are in the order of up to 30 minutes and more. The most difficult problem is that of eliminating phase disturbances arising from the arrival of the video pointers which are used to bring the net flow of information back to the original input rate. A number of techniques have been proposed to address this problem, but none has been entirely successful.

A desynchroniser which uses the synchronous property of SONET to diminish the effect of pointer variations on an output clock phase is described by S. Say in Bellcore Standard T1X1.6/88-026, Jul. 25, 1988, pages 2 to 9.

SUMMARY OF THE INVENTION

According to one aspect of the invention there is provided an arrangement for desynchronising video signals broadcast over a synchronous network, the arrangement including means for demapping input video information, a feedback control loop incorporating a first-in-first-out (FIFO) buffer store into which the demapped video information bytes are written and from which said bytes are read, said store having a first wriite input for the demapped information, a second read input and an output, an amplifier coupled to the output of the buffer store, a tuneable oscillator adapted to provide a video line clock from the demapped video information and coupled to the output of the amplifier via a transfer function circuit, and an integrator coupled to the oscillator and to the read input of the FIFO buffer so as to close the feedback loop and so as to determine the fill depth of the FIFO buffer, said fill depth providing an error reference for the feedback control loop, there being means for controlling the oscillator frequency and for reading the video information from the store at a rate determined by the oscillator frequency such that the rate of information flow around the feedback control loop is substantially constant.

According to a further aspect of the invention there is provided a method for desynchronising video signals broadcast over a synchronous network incorporating a feedback control loop having a first-in-first-out (FIFO) buffer store having read and write inputs and into which received video bytes are written and from which said bytes are read, an amplifier coupled to the output of the buffer store, a tuneable oscillator adapted to provide a video line clock from the demapped video information and coupled to the output of the amplifier via a transfer function circuit, and an integrator coupled to the oscillator and to the read input of the FIFO buffer so as to close the feedback loop and so as to determine the fill depth of the FIFO buffer, the method including demapping said received video information, writing the demapped video information into the wriite input of said buffer store, providing an error reference signal for the feedback control loop from the fill depth of the FIFO buffer, and controlling the oscillator frequency and reading the video information from the store at a rate determined by the oscillator frequency such that the rate of information flow around the feedback control loop is substantially constant.

Reference is here directed to our United Kingdom specification No. No. 2,283,885 which relates to a method of controlling the leakage of a pointer for a pointer justification event (PJE) at the exit from a synchronous transport network to a plesiochronous tributary when video services are carried on the network. In that application, the leak rate of a primary buffer is modulated in a manner whereby the rate of change leak rate is dependent on the rate of arrival of PJE's.

BRIEF DESCRIPTION OF THE DRAWINGS

An embodiment of the invention will now be described with reference to the accompanying drawings in which.

DESCRIPTION OF PREFERRED EMBODIMENT

Figure 1:
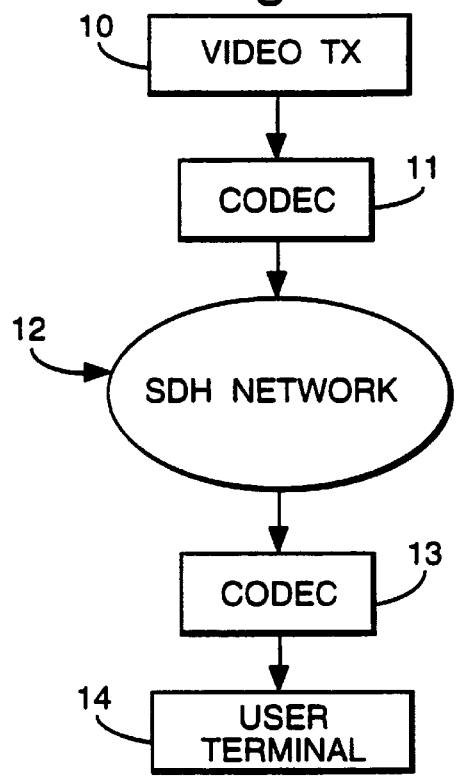
FIG. 1 is a schematic diagram of a synchronous network provided with video broadcast facilities.

Referring to FIG. 1, video information from a transmitter station 10 is mapped into virtual containers via a codec 11 for transmission across the synchronous network 12. At the receiving station or user terminal 14, the video information in the arriving containers is demapped via a codec 13 and is then fed to the user terminal for display. The process for recovering the video information is described with reference to FIG. 2 below.

Figure 2:
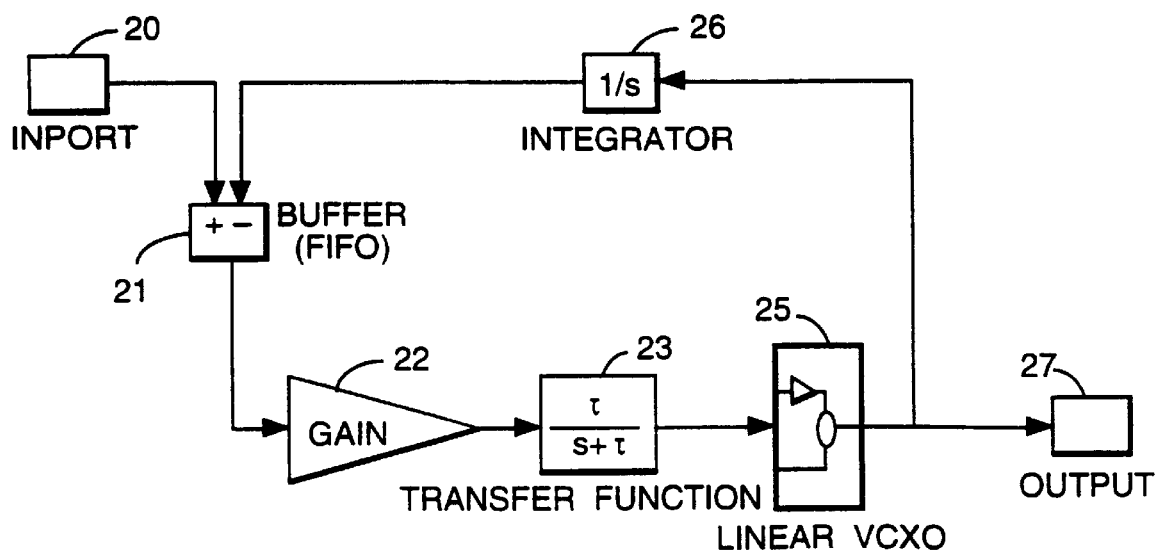
FIG. 2 is a schematic diagram of a desynchroniser arrangement for use in the network of FIG. 1.

Referring to FIG. 2, low frequency phase control is provided by an arrangement based on a control loop. This loop uses the incoming C3 demapped information stream to control the frequency of a voltage controlled oscillator, e.g. a crystal oscillator (VCXO), which in turn provides the 34M line clock. We have found that this arrangement operates effectively, as the phase noise due to pointer and other activities in the information flow into the control loop is outside the bandwidth of the loop. Thus, incoming phase noise appears on the output as a ripple. The loop is therefore designed to maintain this ripple within the video parameters.

The loop comprises a FIFO buffer 21 which accepts bytes arriving at input port 20 from the C3 demapping function and provides a control signal via an amplifier 22 and a transfer function circuit 23 to the oscillator 25. The oscillator output is fed back via an integrator 26 to a second input of the FIFO buffer. The fill depth of the buffer is the error reference used by the control loop. This error is filtered and goes through a digital to analogue conversion to provide the input drive to the oscillator 25. This oscillator is used to read the bytes from the FIFO and provides the reconstituted line clock at output port 27.

The principle of operation of the loop is that the rate of information flow is substantially constant. That is to say that the original input to the synchronous network is from a serial 34M bit stream and the bit rate of this is effectively encoded in the justification pattern of the incoming C3 information stream and in the pointer activity. Thus when an SDH frequency offset comes into play, the arriving pointers operate to bring the net flow of information back to the original input rate. For example, if the receiving node is receiving an AU4 at +3 ppm, the rate of arrival will be too high. The node will re transmit with negative pointer justifications keeping the average information flow rate constant. The pointer activity may thus be viewed as phase disturbance on the 34M serial bit stream.

The amplitude of the phase disturbances has two parts. One part is consequential to the SDH framing and is entirely predictable. The other is the pointer amplitude which is, in the worst case, 8 bits. As the time constant of the control loop is relatively long, a sampled digital system may have a low sampling interval, and for validity, the sampling should occur at a point where the input is stable. This occurs during the section overhead part of the frame. The maximum sampling rate possible in this scheme is thus on a per row basis giving 72 kHz.

The loop may be described by the phase transfer function $$\frac{\Phi_o}{\Phi_i} = \frac{sG\tau}{s^2 + \tau s + G\tau} \quad (1)$$

Assuming that the worst step height will be 16 bits, this function may be used to design the loop. The worst case of 16 bits is based on twice that which would be expected from a pointer. The response to a step is given by multiplying through by K/s and transferring back into the time domain. There are two roots to the denominator. These roots are given as $$\frac{-\tau \pm \sqrt{\tau^2 - 4G\tau}}{2} \quad (2)$$

In a critically, or over damped system the loop transfer function in the form $$\frac{s\omega_n^2}{s^2 + 2\zeta\omega_n s + \omega_n^2} \quad (3)$$

gives the roots as $$\omega_n\left(-\zeta \pm \sqrt{\zeta^2 - 1}\right) \quad (4)$$

The optimal system will be one where the response is critically damped. From equation 3 above, the step response will be $$\frac{K\omega_n^2}{s^2 + 2\zeta\omega_n s + \omega_n^2} \quad (5)$$

where K is the step height. This equation is of the form $$\frac{1}{(s+a)^n} \Rightarrow \frac{1}{(n-1)!} t^{n-1} e^{\tau n t} \quad (6)$$

With n=2 and a=$\omega_{11}$. Thus the time domain response to a step input is $$\Phi_0 = K\omega_{11}{}^2(t_e{}^{31\,\omega d}) \quad (7)$$

The parameter of interest in the desynchroniser for video use, is the rate of change of phase. This can be found from differentiating equation (7) with respect to time giving $$\Phi_0 = K\omega_{11}{}^2(-\omega_{11} t_e{}^{-\omega d} + e^{-\omega d}) \quad (8)$$

The maximum of the modulus of $\Phi_{11}$ will occur when t=0. Therefore $$\Phi_0 = K\omega_{11}{}^2 \quad (9)$$

Going back to the video specification of 0.1 Hz per second at 4.43 MHz, this can be expressed as 0.0225 ppm/s and applied to any carrier rate. At the 34.368 Mbit carrier rate, and using 0.0223 ppm/s for margin, this corresponds to 0.76 bits, or 0.76 UI per second. This is $\Phi_{0max}$. So in response to a 16 bit step, K=16 and $\omega_{11}$ is derived as 0.22 rad/s. Using the format of equation 5 in equation 3 the values of the time constant and gain follow as 0.44 and 0.11 respectively.

For final implementation of the circuit, some boundaries may be defined. The VCXO should preferably have a gain typically of 50 ppm/V. Thus the maximum swing may be + or −2.0V about a 2.5V mean. The overall VCXO gain includes a scalar for the centre frequency, as the deviation is a few parts per million of the centre frequency. Therefore the gain may be split into three components, $G_1$ the calculated gain, $G_v$ the VCXO gain in ppm/V and $G_f$ the centre frequency component. Thus 0.109=$G_1 G_v G_f$. Solving for $G_1$, we have $$G_1 = \frac{0.109}{50 \times 34.368} = 6.3 \times 10^{-5} \quad (10)$$

When in use the loop will effectively be driven by a phase ramp. The VCXO responds to the difference between the information flow rate into the FIFO from the C3, and its own centre frequency. Therefore, in the steady state, a static error is present in the buffer representing the drive voltage to maintain the offset.

The step input to the system is given as amplitude 16 bits. The rate of change of frequency is detected by the du/dt term and the output response gives an initial rate of change of frequency of 0.76. The frequency performance of the loop may be determined by providing an input ramp. In this case, the interesting activity is the response of the system to a step change in input frequency. Such conditions can occur in the network if a user switches the 34M line from one source to another. This may give a theoretical maximum step change of 40 ppm.

The initial conditions of the FIFO buffer 21 are set to leave enough room for the step inputs to go to the positive or negative limits. The maximum allowable step change in input is given by the 34M line being switched from a −20 ppm line to a +20 ppm line. This gives a step input of 40 ppm swing. This will always be the maximum amplitude and a first approximation of the FIFO depth requirements are to equal this with a centre at the mid point. Using a 40 ppm step the max. fill is given as $$fill_{max} = \frac{40}{G_v G_1} \quad (11)$$

This is solved to give a step amplitude of 12699 bits, or 1588 bytes.

Consideration should also be given to the steady state error introduced by the variation in centre frequency of the VCXO. Taking this to be typically +/−25 ppm, the swing from this is greater than the input line frequency. The effect of this is to skew the FIFO fill about a point not equal to the mid point. For example, if the VCXO is supplied with an open loop centre frequency of +25 ppm, this would mean that the output frequency would be at +25 ppm offset when the input voltage was at 2.5V. Thus to drive a nominal 0 ppm line offset, a steady state drive voltage of 0.5V is required. This 0.5 V will correspond to a buffer "fill" of 7936 bits.

In a practical implementation, the FIFO will be given a fixed centre, such that the fill, during any of the input conditions will never cause the read and write address printers to coincide or crash. Therefore in the sample case this will be equal to half the maximum swing amplitude plus a margin for frame jitter and pointer bursts. Nominally this will be 794 bytes, from the solution to equation 11. However, if a steady state error exists, this will form an additional offset to the FIFO centre. A preferred way of overcoming this is to use the fact that the centre frequency is a steady state value which may be tuned out at manufacture. This may be effected by providing an additional steady state error register which is used at manufacture to set the open loop centre frequency. This value is stored in non volatile memory and written to the mapper at power up. The magnitude of the steady state error is important to balance against the dynamic range of the VCXO. The +/−25 ppm variation corresponds to a maximum of 1V of range required on a 50 ppm/V device. The available dynamic range for line tracking is therefore reduced to 3V as +/−1.5V. At 50 ppm this allows for 150 ppm tracking which can adequately cover the line variations in a second order control system. However, this is just inside the limit for the more complex control situation following. (A 30 ppm VCXO would be unsuitable, as the 50 ppm variation would require 1.8V to tune out. This would leave a range of 2.2V corresponding to 66 ppm. This is just over the required 40 ppm, but would not allow the following cases to function).

The primary limiting factor in the second order loop is the static error. This should not be confused with the previously described steady state error. The static error is that generated by the frequency deviation of the 34M line. This deviation causes a residual fill in the buffer which in turn drives the VCXO in the closed loop control system. This error is constant, after settling, and directly proportional to delay (with a constant of proportionality of $2.91 \times 10^{-8}$ seconds per bit at 34.368 Mbit/s line rate). With the system simulated, a FIFO size of 1588 bytes is required centred about 794 bytes. The delay through this system is be determined by the fill state of the buffer, which in turn is determined by the input frequency deviation. A deviation of −20 ppm will have a nominally zero delay and a deviation of +20 ppm will have nominally 370 microseconds. The 100 microsecond maximum delay specification is therefore compromised. It is preferred to remove the delay dependence on input frequency deviation by eliminating the static error.

In order to drive the static error to zero it is necessary to provide effectively an "imaginary" static error. This takes the form of providing a drive to the VCXO when the system has settled to zero error in the buffer. An integrator is therefore necessary to provide an output when its input is zero. This turns the loop into a third order system by summing the integral of the error scaled to the filtered scaled error term driving the VCXO. The characteristic equation is now given as $$\frac{s((K + G\tau)s + K\tau)}{s^3 + \tau s^2 + (K + G\tau)s + K\tau} \quad (12)$$

Note that when the scalar K is set to zero, the characteristic resumes to the second order original of equation 1. The effect of the integral term may be kept to a minimum if the constant scalar K is around an order of magnitude less than G. Both of these constants are compound, and both share the terms, $G_v$ and $G_f$, so the effect can only be achieved by setting $K_1$ an order of magnitude or so less than $G_1$.

The simplest means of ensuring a better than 0.76 ppm/s step response, is to add the third order gain term at tenth gain in parallel with the second order term and adjust on resulting simulations of 16 bit step responses. The time constant required reduction and the gain of the integrating term were reduced to approximately a thirtieth. The method used here was to adjust the gain down until the roots of the denominator of the third order polynomial in s become real. This gives a damping factor of 1 and the third order loop is accordingly critically damped.

What is claimed is:

1. An arrangement for desynchronizing video signals transported in virtual containers in frames and received from a synchronous network, each virtual container being identified within a said frame by a pointer introduced by the synchronous transport process, the arrangement comprising means for demapping input video information from said frames so as to recover video information bytes, a phase locked control loop system having a bandwidth sufficiently narrow to effectively ignore phase noise created by the pointers and incorporating a first-in-first-out (FIFO) buffer store into which the demapped video information bytes are written, said store having a first write input for storing the demapped information at the rate at which that information is demapped, a second read input and an output, an amplifier coupled to the output of the buffer store, a voltage controlled oscillator having an output and having a control input coupled to the output of the amplifier via a transfer function circuit and said output controlling via a feedback path incorporating an integrator to said read input of said buffer store the rate at which stored video information is read from the buffer store such that the rate of information flow around the feedback control loop is substantially uniform, said oscillator being arranged to provide a video line clock from the read video information, and wherein the fill depth of the FIFO buffer store, provides an error reference for the voltage controlled oscillator frequency so as to increase or decrease that frequency as said fill depth increases or decreases respectively.

2. An arrangement as claimed in claim 1, wherein said oscillator is a voltage controlled crystal oscillator having a frequency variation of about 25 parts per million about a centre frequency.

3. A telecommunications subscriber terminal provided with a video desynchronising arrangement as claimed in claim 1.

4. A method for desynchronizing video signals transported in virtual containers in frames and received from a synchronous network, each virtual container being identified within a said frame by a pointer introduced by the synchronous transport process; the method comprising; demapping input video information from said frames so as to recover video information bytes, writing said demapped video information at the rate at which that information is demapped into a first-in-first-out (FIFO) buffer store having a read input, a write input and an output, said buffer store forming part of a phase locked control loop system incorporating a voltage controlled oscillator having a control input and an output, said loop having a bandwidth sufficiently narrow to effectively ignore phase noise created by the pointers, applying said oscillator output via an integrator to said read input of the buffer store so as to control the rate at which the demapped stored video information is read from the buffer store such that the rate of information flow around the feedback control loop is substantially uniform, said oscillator being arranged to provide a video line clock from the read video information, and providing to the oscillator control input via a transfer function a control voltage corresponding to the fill depth of the buffer store so as to increase or decrease the oscillator frequency as said fill depth increases or decreases respectively.

5. A method as claimed in claim 4, wherein said voltage controlled oscillator has a frequency variation of about 25 parts per million about a centre frequency.

6. A method as claimed in claim 5, wherein said buffer store has an average fill depth skewed from a half full condition.

\* \* \* \* \*